April 14, 1964 — A. WESP — 3,128,624
HEAT QUANTITY METER
Filed Feb. 24, 1961 — 2 Sheets-Sheet 1

April 14, 1964   A. WESP   3,128,624
HEAT QUANTITY METER
Filed Feb. 24, 1961   2 Sheets-Sheet 2
FIG. 4
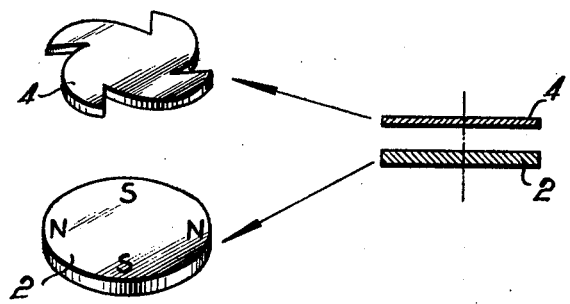
FIG. 5
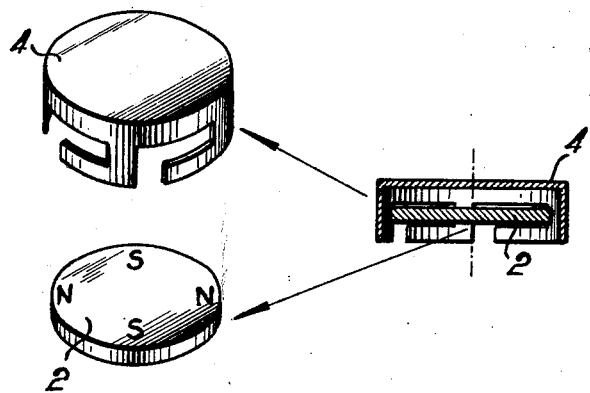
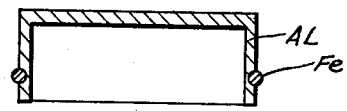
FIG. 6

United States Patent Office 3,128,624
Patented Apr. 14, 1964

3,128,624
HEAT QUANTITY METER
Adam Wesp, Messenhausen, Hesse, Germany, assignor to Techem G.m.b.H., Frankfurt am Main, Germany, a German body corporate
Filed Feb. 24, 1961, Ser. No. 91,495
Claims priority, application Austria Jan. 22, 1961
14 Claims. (Cl. 73—193)

This invention relates to a heat quantity metering device comprising a driving means responsive to the flow of the heat vehicle, and a coupling which is connected thereto and the output of which is coupled to integrating indicating means.

The invention relates more particularly to a device for measuring the heat taken from central-heating systems.

Two methods are used to measure the heat taken from a heating system. Firstly, the total consumption of an installation can be determined by the fundamental calorific equation, by multiplying the amount of heat vehicle, for example warm water or hot water, flowing at any time by the temperature drop and continuously totalising the product. Alternatively, the amounts of heat supplied and carried off can be measured separately and subtracted from one another, i.e. the incoming amount of heat $Q_1 = C.M.T_{\cdot 1}$ and the amount of heat flowing back $Q_2 = C.M.T_{\cdot 2}$, so that the quantity of heat exchanged is $Q = Q_1 - Q_2$, wherein:

Q=amount of heat (kcal./h.).
M=amount of heat vehicle (kg./h.).
C=specific heat of vehicle (kcal./° C. kg.).
$T_1$=temperature of incoming heat vehicle (° C.).
$T_2$=temperature of returning heat vehicle (° C.).

For this purpose, however, it is essential that the pipes should be so laid that all the radiators of the installation are fed from a single common flow and return. This applies, for example, to multi-story building heating systems or entire buildings or sets of buildings.

In many cases, however, particularly in the case of gravity heating systems, the individual radiators of a tenant are supplied by means of a plurality of vertical supply lines, from each of which the radiators of different tenants living one above the other are supplied. In this case, therefore, it is necessary to measure the heat emission of each individual radiator separately. The use of an instrument operating on the above-mentioned fundamental calorific equation principle is not possible owing to the considerable size necessary and the higher price associated with the greater outlay.

The second method of heat measurement is based on the radiation equation of a radiator. This is as follows:

$$Q = k.F.(T_m - T_z) \text{ kcal./h.}$$

This radiator equation thus furnishes the amount of heat emitted by a radiator, and this heat emission is dependent on the mean temperature $T_m$ of the heat vehicle in the radiator, but not on the amount of medium flowing. The area F and the special construction $k$ of the radiator are allowed for by the said two constants. The $k$-values are given in tables for the various types of radiator. The temperature $T_z$ of the ambient air (for example room temperature) may also be regarded as substantially constant, since, for example, each tenant will set the room temperature to about 20° C. because any deviation from this is found to be unpleasant.

A heat meter operating on the radiation equation principle gives the advantage of simplification and lower costs in comparison with an instrument operating by the first method.

The two methods, however, are equally exact and are physically equivalent. The first or second method will have to be used according to the particular application—whether it is desired to measure the amount of heat transported or emitted. In the practical measurement of quantities of heat all variants occur since the pipes in older installations are disposed vertically, i.e. a number of homes are supplied from one and the same vertical supply line, while in more recent installations, which usually operate with pumps, the horizontal supply is preferred (i.e. similar to the arrangement of electrical cables). In the case of vertical distribution, measurement must be carried out at each individual radiator, and as already stated this is advantageously effected by the said radiation equation.

In the case of horizontal distribution, total measurement may be effected. To this end, a calorimeter is installed either in the flow (in the case of a return regulated to a constant temperature) or in the return (in the case of a flow regulated to a constant temperature), or both in the flow and in the return if the two temperatures may fluctuate freely, and the heat consumption is determined from the difference between the readings. Since the modern systems usually operate with a regulated flow or return, one device is therefore usually sufficient. Even if it is necessary to use two devices, however, the outlay is still much lower than with the conventional measuring processes wherein the measurement of the amount of heat is effected by complicated electrical or mechanical devices. Even with the apparatus of the present invention, of course, it would be possible to effect such a subtraction directly in one device by appropriate structural combination.

To solve these problems, various proposals have already been made. According to a first proposal, it is known to equip the meter with a variable mechanical transmission ratio, the variation of which is effected automatically in dependence on the operation of a temperature-dependent device, for example a bimetallic strip.

A calorimeter is also known wherein the product of the quantity and the temperature difference is formed by a magnetoelectric device, and wherein the quantity of flowing medium produces the movement which is required for the inductive effect and which is proportional to the throughput by the fact that the path of the lines of force of the magnetoelectric device consists completely or partially of a magnetic material having a temperature-dependent permeability.

A heat meter has also been proposed which operated on the principle that a current produced by a temperature measuring element serves to produce a magnetic field which varies with the temperature and the lines of force of which pass through a meter disc disposed between the magnet and a magnetic circuit, and the meter disc is coupled to a quantity meter having a speed of rotation proportional to the throughput.

All these devices, however, are mechanically and electrically complicated in their construction and do not always ensure complete operational dependability and the required accuramy of measurement with the different kinds of conditions that occur in practice, since the operative effects are relatively weak.

The present invention has for its object to obviate these disadvantages in an extremely simple way while at the same time a much higher accuracy of measurement is obtained with low production costs.

This is achieved according to the invention by constructing the heat quantity meter as a magnetic coupling, the input of which is formed by a magnet mounted on a bladed wheel and the output of which has a rotor which is surrounded by a viscous medium in order to obtain a viscosity-dependent braking effect, and the viscous medium is in good heat exchange with the heat vehicle in such manner that a change of temperature of the heat vehicle results in a corresponding change of viscosity of the viscous medium and hence a change of the speed of the rotor.

The rotor or parts thereof are advantageously themselves part of the magnetic coupling.

Further features, advantages and possible applications will be apparent from the following detailed description of several embodiments of the invention given by way of example with reference to the accompanying drawings, in which:

FIGURES 4 and 5 show different constructions of the rotor according to the invention, and FIGURE 6 is a cross section of a rotor illustrating its ferromagnetic and non-ferromagnetic portions.

Figure 1:
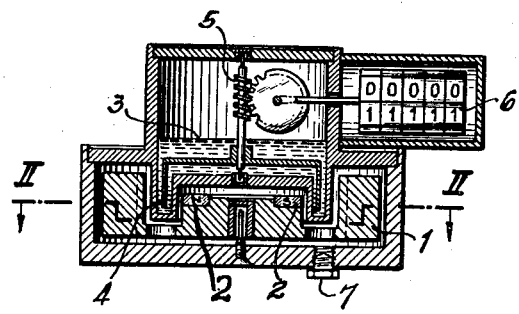
FIGURE 1 is a section showing the diagrammatic construction of a heat quantity meter according to the invention.
Figure 2:
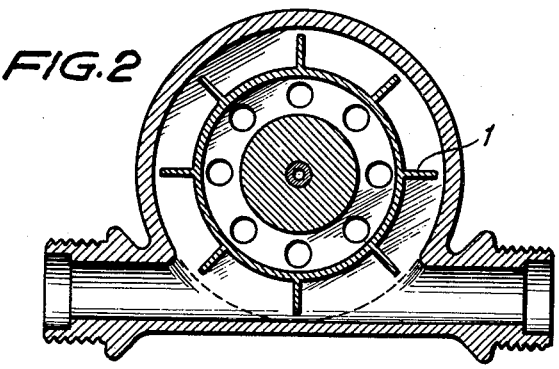
FIGURE 2 is a section of FIGURE 1 on the line II—II.
Figure 3:
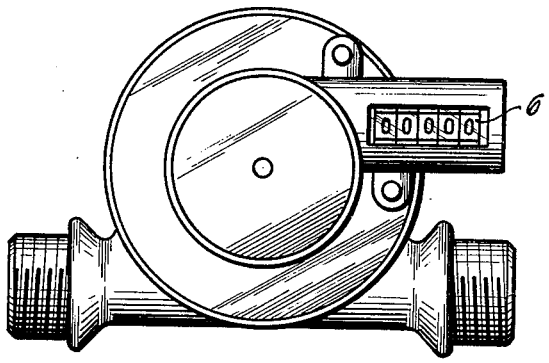
FIGURE 3 is a plan view of the heat meter according to the invention.

A bladed wheel 1 driven by the flowing medium carries a magnet 2, the field of which extends to the rotor 4 which is situated in the upper part and which is disposed to be rotatable in a viscous liquid 3. Said rotor is driven on the rotation of the bladed wheel by the coupling force of the magnet 2 which is magnetized with two or more poles, since a driving torque forms in the rotor. It would in principle be possible to change the magnet and rotor over without changing the effect.

The revolutions of the rotor are transmitted by a reduction gear 5 to an integrating indicating device, which is here illustrated as a register 6, and given appropriate calibration they directly furnish the amount of heat taken, as will be explained hereinafter.

It may be assumed that the heat meter is disposed in the middle of a divided radiator. As the heat vehicle flows the bladed wheel 1 rotates and hence also rotates the permanent magnet 2, which is rigidly connected to the bladed wheel. According to the invention and according to one embodiment of the device, this permanent magnet, which is magnetized with two or more poles, produces during its rotation, a constant driving torque on the rotor mounted in a viscous oil in the top part of the device, and this is so independently of the speed of rotation of the bladed wheel. This can be achieved in practice by using the hysteresis effect by constructing the rotor as a cylindrical or pot-shaped body from iron or, in order to increase the driving torque, giving it the form of an armature of iron having asymmetrical poles, for example four poles in the case of four-poled magnetization of the magnet (see FIGURES 4 and 5). The permanent magnet rotating with the bladed wheel exerts a driving torque whenever its poles pass those of the rotor. If the magnet rotates more rapidly, although the duration of the action is shorter than in the case of a slow rotation, the frequency of the passages is greater to the same extent, so that the mean value of the driving torque per unit of time is constant and independent of the speed of rotation. According to the number of poles of the magnet the torque varies repeatedly from a minimum value to a maximum value during one revolution. It is advantageous to make the amplitude of this periodic fluctuation small in order to avoid any "chatter" of the rotor. This is effected simply, for example, by making the number of poles of the rotor, not equal to the number of poles of the magnet as shown in FIGURES 4 and 5, but less or more for example with three or five or even more poles in the case of a four-poled magnet.

The device is advantageously calibrated in a magnetic alternating field, the permanent magnet which is first fully magnetized being attenuated to the required magnetic strength. Such a magnet which is attenuated and stabilized in an alternating field also gives the advantage that its strength remains continually unchanged.

It is also advisable to enclose the complete device in a thin high-permeability screen or to make the housing from such a material in order to prevent the indication from being deliberately influenced by extraneous fields.

According to another embodiment of the device, a speed-dependent driving torque on the eddy current principle is produced instead of this system of torque production operating on the principle of hysteresis drive with a rotor of ferromagnetic material and/or having asymmetrical poles, wherein the resulting driving torque is constant independent of the speed of the bladed wheel. If the material chosen for the rotor is an electrically conductive non-ferromagnetic material, for example aluminium or copper, a driving torque proportional to the speed of the bladed wheel and hence proportional to the speed of the flowing heat vehicle is obtained.

Moreover, by combining the hysteresis drive and the eddy current drive it is possible to produce a constant driving torque which is independent of the speed and upon which there is superimposed a driving torque proportional to the speed. This may be embodied, for example, by additionally surrounding a rotor—which may consist of aluminum or copper—with an iron wire ring. Finally, the magnetic coupling between the magnet and the rotor may be made so strong by suitable pole construction that the two run in synchronism and the speed of the bladed wheel is influenced retroactively by the braking force of the viscous liquid. To this end, the gaps between the bladed wheel and walls are advantageously enlarged to facilitate braking of the bladed wheel.

It is thus possible, by means of slight alterations to the rotor for example by material or shape, to determine the suitable type of coupling in order to take into account the speed of the flowing heat vehicle to a greater or lesser degree depending upon the requirements of the heating system.

In consequence of the good heat contact, the viscous medium in the upper part of the heat meter assumes the temperature of the flowing heat vehicle and consequently has a viscosity determined by this temperature. The viscous oil now brakes the rotor to such an extent that the operative braking moment is in equilibrium with the driving torque. In order, for example, to obtain a speed relationship of the rotor in proportion to the temperature, the following equation of condition must be obtained from the viscosity-temperature curve of the braking medium used:

$$\eta = \frac{\text{const.}}{T_m - T_z}$$

Exhaustive tests with numerous oils or mixtures and solutions of high-polymers have shown that this condition can be achieved with sufficient accuracy over a relatively large temperature range. Silicone oils or mixtures of such oils with so-called transformer oils have proved particularly suitable. For example, a mixture of silicone oil DC 200 (5000 cst. at 20° C.) with Clophen A 50 (a chlorodiphenyl) in equal parts satisfies the above condition.

The above-described arrangement with the installation of the device in the centre of the radiator constitutes the ideal case, because in this case the measurement really is completely independent of the amount of heat-vehicle flowing. In the case of a slow flow, for example gravity heating systems, a flow-temperature of, for example, 90° and a return temperature of 70° may be associated with an assumed mean radiator temperature of 80°. If the flow is four times more rapid for example in a pump heating system, the flow temperature is then only 82.5° and the return temperature 77.5°. The amount of heat emitted by the radiator is the same in both cases, however, and measurement with a device of the present invention also furnishes the same value.

In many cases, however, the device cannot be installed in the centre of the radiator but must be installed in the flow or return of the radiator. In these cases, use is made of the fact that both the flow temperature and the return temperature are functionally related to the mean radiator temperature to be measured. In the simplest case, this is taken into account by an appropriately corrected calibration. In the case of higher accuracy requirements the speed of flow must also be allowed for, since the temperature measured in the flow and return deviates less from the mean radiator temperature, the higher the speed of flow of the vehicle. The speed of flow is allowed for with the steps already described.

In some applications it is advantageous to brake the rotor by means of a primary braking force until this fixed braking force is exceeded by the driving force.

With such an arrangement it is possible to record when a fixed desired value is exceeded. This can be achieved, for example, by using a viscous medium which becomes solid below a predetermined temperature, or which has a flow limit differing from zero. Special speed characteristics can be obtained by using an oil having an intrinsically viscous behaviour, since intrinsically viscous substances give non-linear relationships between the speed and the braking force.

The drive for the magnet from the bladed wheel can also be replaced by an auxiliary drive (for example a clockwork mechanism, electric motor or the like), which remains in operation for as long as the heating system is in operation. The register may also be replaced by a remote registering device or be completed by such a device, while it is also possible for a number of or all the individual radiator devices to transmit their count to a central register.

It is advantageous to provide a dirt trap in the heat-vehicle part of the meter housing, for example in the form of a blind hole closed by a screw 7, which can be provided with a magnetic bar in order to improve the action.

The above-described conditions show that the present measuring principle constitutes an exact measuring process despite its extreme simplicity. In comparison with disclosed calorimetric methods operating with complicated mechanical or electrical devices, the entire process according to the present invention is effected by means of a single movable part, the rotor, if the bladed wheel as the driving element and the register as the integrating indicating means are disregarded. The invention therefore constitutes an extreme simplification of a multiplying and integrating measuring instrument. Its basic construction is even much simpler than ordinary water meters, which generally have complicated reduction gears, usually in a flowing medium in order to obtain an adequate force boost in front of the built-in gland and lead-in which dissipates the force. In comparison with known water meters having a magnetic coupling and blocking the registration below a certain fixed temperature value, the present invention has the decisive advantage that it continuously and exactly allows for the temperature so that it gives the prerequisites for a measuring device.

I claim:
1. A heat quantity metering device, comprising
  a housing containing first and second chambers arranged in heat-exchanging relationship, said first chamber having an inlet and an outlet for the passage of a temperature-modifying fluid therethrough;
  a bladed wheel rotatably mounted in said first chamber, said wheel being arranged to be rotatably driven by the flow of said temperature-modifying fluid through said first chamber;
  a quantity of a viscous medium in said second chamber in heat-exchanging relationship with said temperature-modifying fluid, the viscosity of said medium varying in accordance with changes in the temperature of said fluid;
  a rotor rotatably mounted in said second chamber for rotation about an axis colinear with the axis of rotation of said wheel, at least a portion of said rotor being submerged in said viscous medium;
  magnetic coupling means causing said rotor to be rotatably driven by said wheel;
  and indicating means responsive to the rotary speed of said rotor, whereby the viscosity of the viscous medium and the braking effect on the rotor produced thereby are a function of the temperature of the temperature-modifying fluid.

2. A heat quantity metering device according to claim 1, characterized in that at least a portion of the rotor constitutes a part of the magnetic coupling.

3. A heat quantity metering device according to claim 2, characterized in that the viscous medium has a viscosity-temperature curve corresponding to the equation:

$$\frac{\text{const.}}{T_m - T_z} \text{ for } T_m \geq T_z$$

wherein $\eta$ represents the viscosity of the medium, $T_m$ represents the temperature of the medium, and $T_z$ represents the temperature of the ambient atmosphere.

4. A heat quantity metering device according to claim 3 wherein said viscous medium comprises a silicone oil.

5. A heat quantity metering device according to claim 3, characterized in that the viscous medium has a flow limiting differing from zero.

6. A heat quantity metering device according to claim 3, characterized in that intrinsically viscous substances are used as viscous medium.

7. A heat quantity metering device according to claim 3, characterized in that the viscous medium brakes the rotor to a speed of zero below a predetermined temperature.

8. A heat quantity metering device according to claim 3 wherein said housing is formed from a material having a high permeability.

9. A heat quantity metering device according to claim 3, characterized in that the rotor consists of ferromagnetic material, whereby the rotor is driven by hysteresis effect with a constant mean driving torque per unit time independent of the rotary speed of said wheel.

10. A heat quantity metering device according to claim 9, characterized in that the rotor is constructed with asymmetrical poles.

11. A heat quantity metering device according to claim 3, characterized in that the rotor consists of a non-ferromagnetic material, whereby the rotor driving torque is dependent on the rotary speed of the wheel and the flow of said temperature-modifying fluid.

12. A heat quantity metering device according to claim 3, characterized in that the rotor consists of a non-ferromagnetic material in combination with a ferromagnetic material.

13. A heat quantity metering device according to claim 1, and further including dirt trap means associated with the first chamber of said housing.

14. Apparatus as defined in claim 3 wherein said viscous medium comprises a mixture of equal parts of silicone oil DC 200 (5000 cst. at 20° C.) and Clophen A 50 (a chlorodiphenyl).

References Cited in the file of this patent
UNITED STATES PATENTS 2,674,118 Westmoreland _____ Apr. 6, 1954
2,774,242 Wesp _____ Dec. 18, 1956

FOREIGN PATENTS 750,754 France _____ June 6, 1933